Aug. 2, 1966 J. C. NASH 3,263,523
POSITIVELY DRIVEN VARIABLE SPEED MECHANISM
Filed May 23, 1962 6 Sheets-Sheet 2

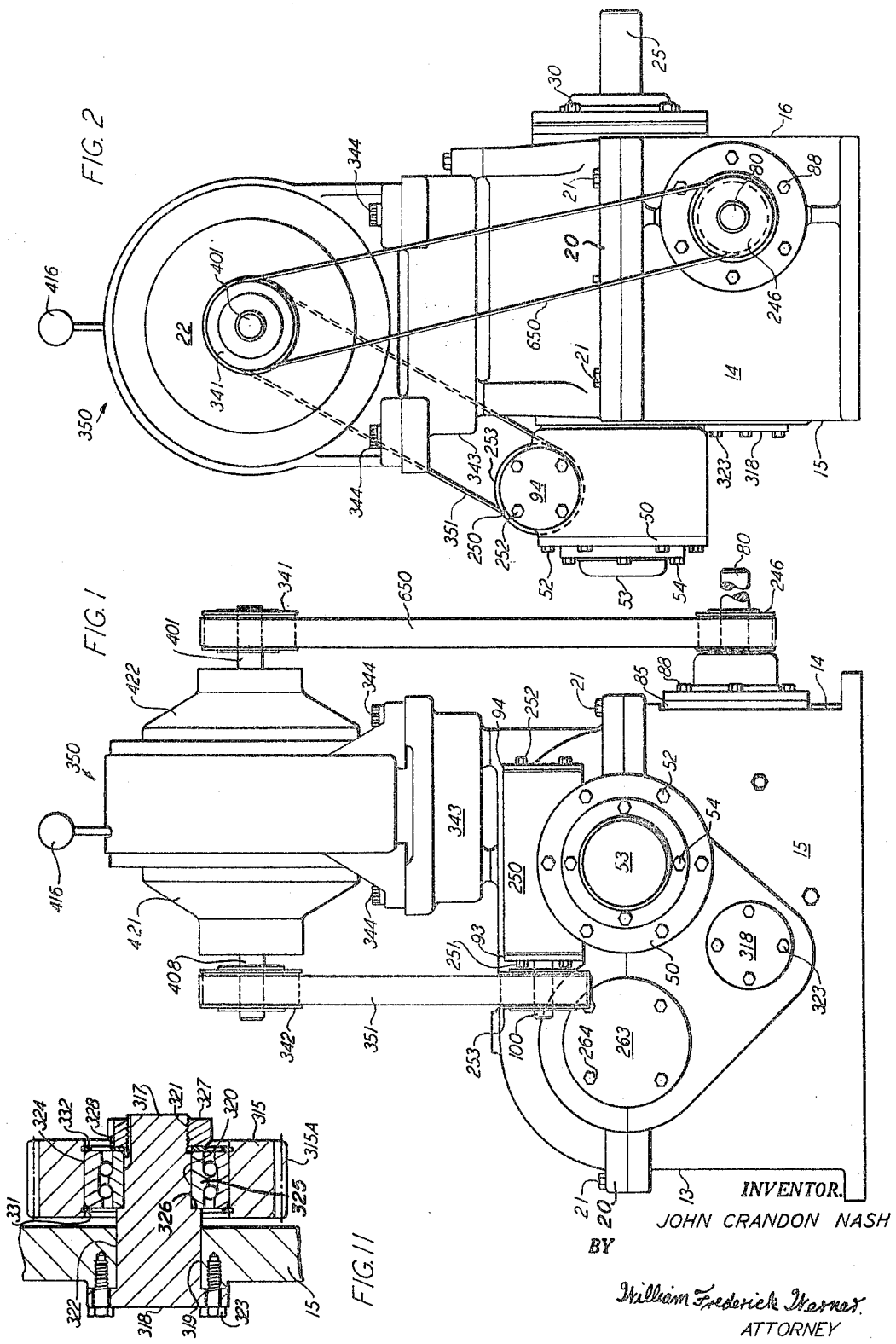

INVENTOR.
JOHN CRANDON NASH
BY
William Frederick Werner
ATTORNEY

Aug. 2, 1966  J. C. NASH  3,263,523
POSITIVELY DRIVEN VARIABLE SPEED MECHANISM
Filed May 23, 1962  6 Sheets-Sheet 3

INVENTOR.
JOHN CRANDON NASH

BY
William Frederick Werner
ATTORNEY

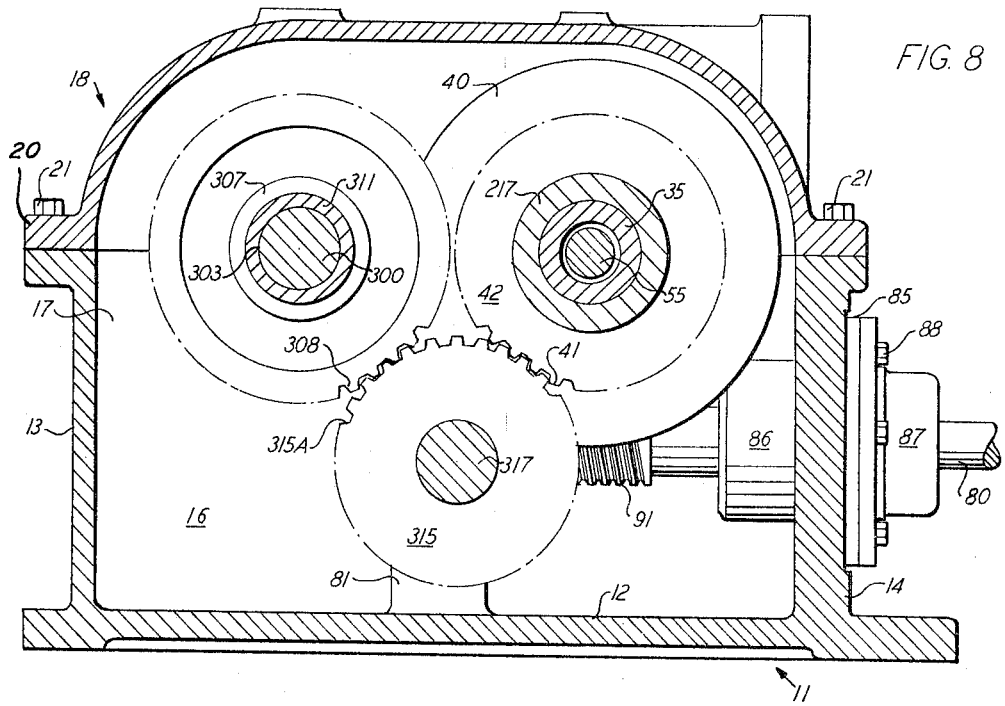

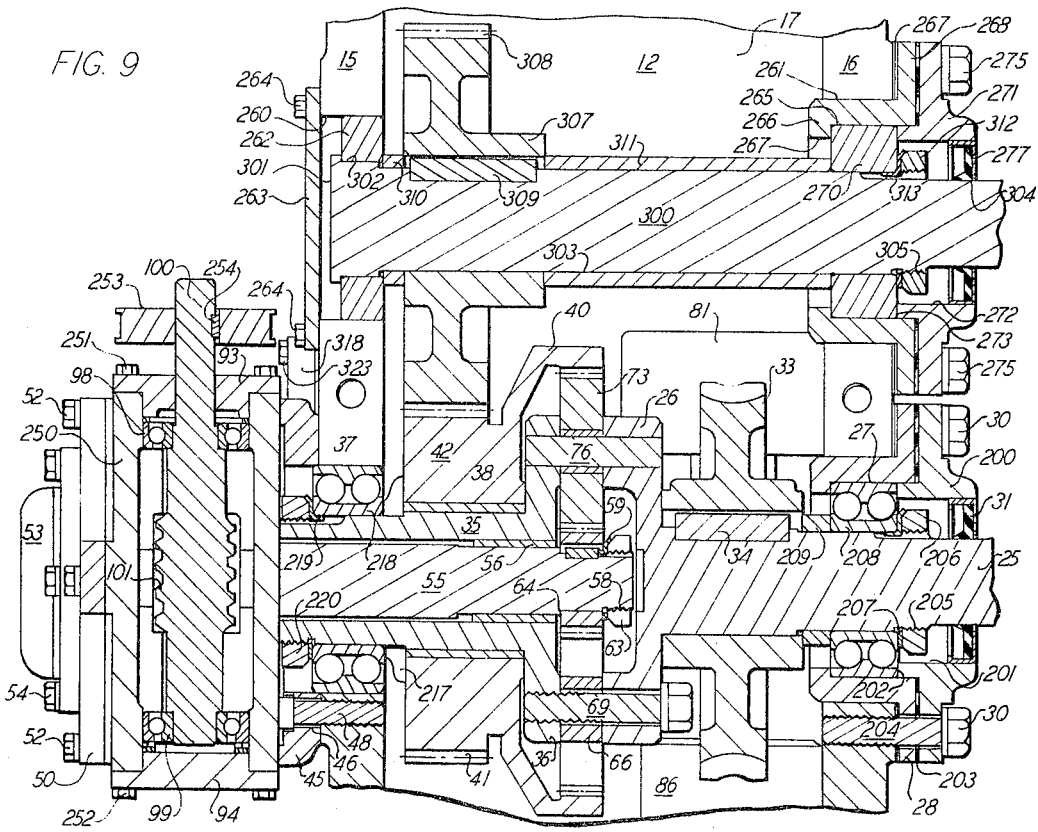

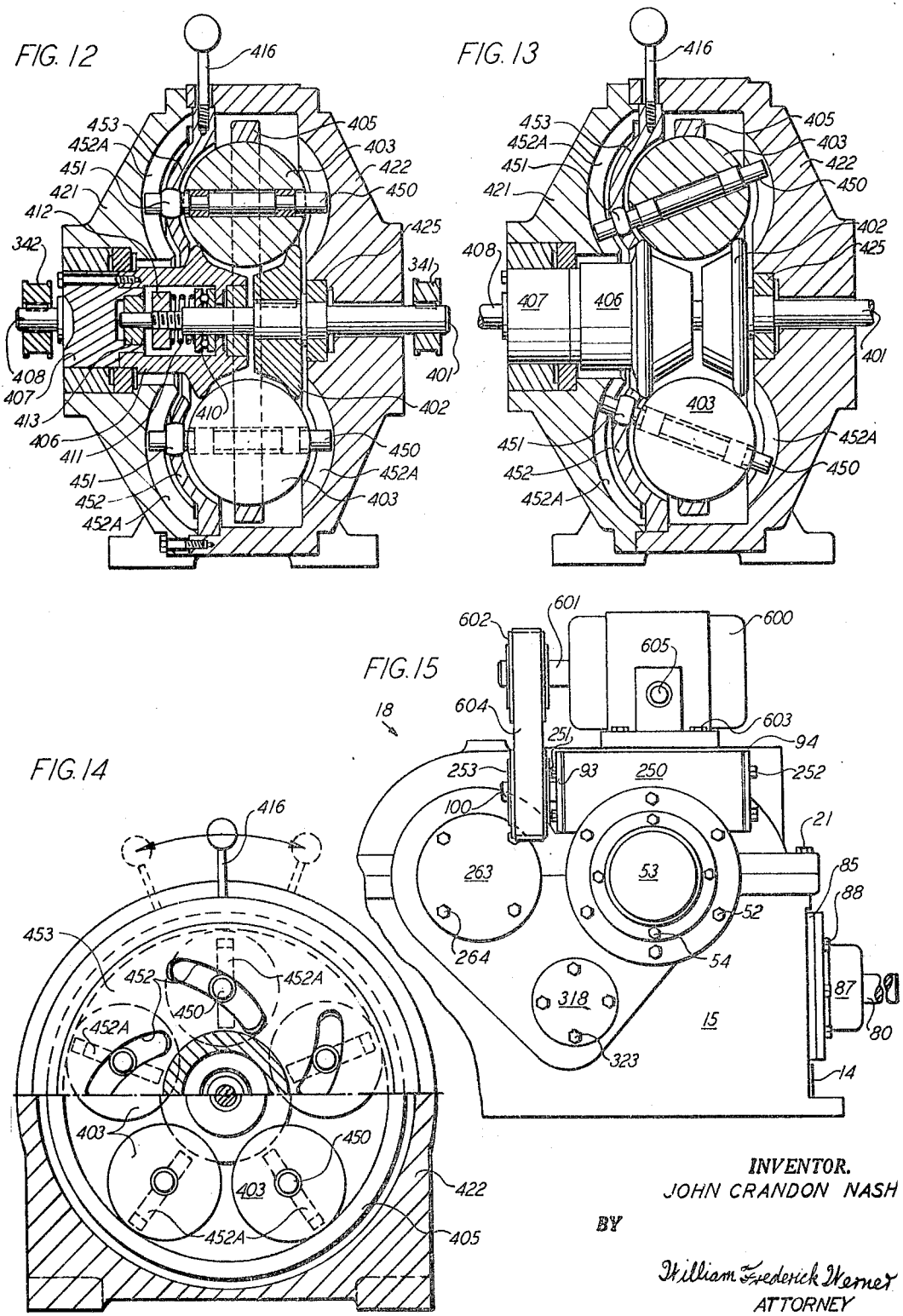

United States Patent Office 3,263,523
Patented August 2, 1966

3,263,523
POSITIVELY DRIVEN VARIABLE
SPEED MECHANISM
John Crandon Nash, Providence, R.I., assignor, by mesne assignments, to Bevis Industries, Inc., Providence, R.I., a corporation of Florida
Filed May 23, 1962, Ser. No. 197,016
3 Claims. (Cl. 74—665)

This invention relates to mechanism for driving two rotatable shafts at variable relative speeds, and more particularly to mechanism for positively driving two shafts and for varying the relative speed of one shaft in relation to the speed of the other shaft.

An object of the present invention is to provide a mechanism for positively driving two shafts, a first shaft at a predetermined constant speed and the second shaft at a variable speed thereto from a position where said second shaft is stationary and may be caused to rotate at varying speeds up to and including the speed of said first shaft.

Another object of the present invention is to provide a mechanism for positively driving two shafts, a first shaft at a preselected speed and direction and the second shaft at a variable speed thereto and in either the same direction of rotation or in the opposite direction of rotation to said first shaft.

Still another object of the present invention is to provide a novel type of driving mechanism for two shafts whereby both shafts are positively driven from a single power source with the peripheral speed of one shaft varying in both speed and direction in relation to the speed and direction of the other shaft.

And still another object of the present invention is to positively drive two shafts from a single power source and provide a variable speed mechanism whereby the second shaft may be driven at a variable speed and in a preselected direction to a first shaft and whereby the second shaft may be driven at a variable speed and in a preselected direction to the direction of rotation of the shaft of the power source when said first shaft is rotating without the benefit of a work load.

In the past variable speed mechanisms inherently contained slippage. A first shaft would be rotated at a preselected number of revolutions per minute. A second shaft through a variable speed mechanism would be rotated at a different preselected number of revolutions per minute to provide a preselected difference in the revolutions per minute between said first and second shafts. However, during the working cycle of the two shafts the preselected difference in the revolutions per minute would vary greatly and beyond a difference in the preselected revolutions per minute between shafts which could be commercially tolerated in the work performed by the two shafts. This uncontrollable variation in the difference between the speeds of the two shafts is due to slippage in the variable speed mechanism or in the drive mechanism which connects the two shafts to the power source of those shafts whether it be a single source of power for both shafts or a separate source of power for each shaft.

The present invention overcomes the disability of slippage in a variable speed mechanism by providing a positive drive between shafts. In addition applicant's positively driven variable speed mechanism permits one shaft to remain in a condition of no revolutions or be rotated in increased infinite degrees of rotation up to the speed of rotation of the other shaft. The relative difference in the number of revolutions per minute between the shafts remaining constant during a work cycle.

With these and other objects in view, this invention consists in certain novel features of construction, combination and arrangement of parts to be hereinafter more fully described and claimed.

Referring to the drawings in which similar characters of reference indicate corresponding parts:

FIGURE 1 is a front elevational view of the new and improved positively driven variable speed mechanism.

FIGURE 2 is a right side elevational view of FIGURE 1.

FIGURE 7 is a vertical cross sectional view taken on line 7—7 of FIGURE 5.

FIGURE 8 is a vertical cross sectional view taken on line 8—8 of FIGURE 5.

FIGURE 9 is a fragmentary horizontal cross sectional view taken on line 9—9 of FIGURE 5.

FIGURE 10 is an end view of the housing and cover, with a section broken away as indicated by line 10—10 in FIGURE 5.

FIGURE 11 is a fragmentary cross sectional view illustrating the mounting of idler gear 315

FIGURE 12 is an axial section view taken through the variator.

FIGURE 13 is a section similar to FIGURE 12, with the roller bodies in a tilted position.

FIGURE 14 is partly a lateral view and partly a radial section of FIGURES 12 and 13.

FIGURE 15 is a modified form of speed control device.

Figure 6:
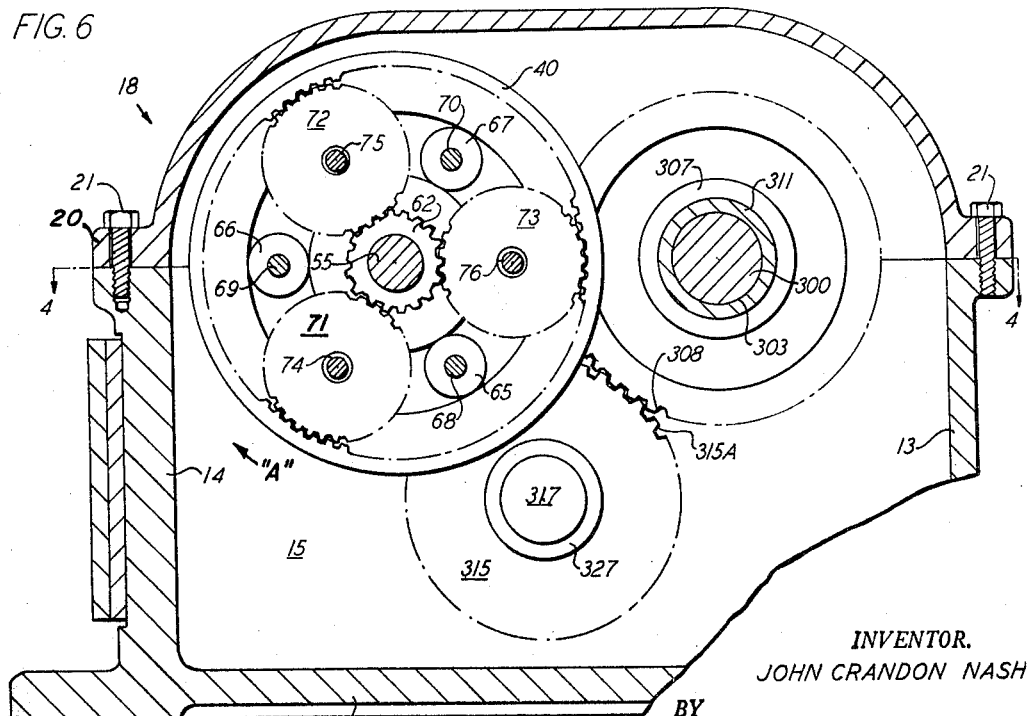
FIGURE 6 is a transverse cross sectional view taken on line 6—6 of FIGURE 4.

With reference to the drawings, there is illustrated a housing, generally indicated by reference numeral 11, consisting of a bottom 12 (see FIGURES 4 and 6), a left side 13, a right side 14, a front side 15 and a rear side 16, which unite to form a cavity 17.

A cover, generally indicated by reference numeral 18, is provided with a flange 20, shaped to the contour of housing 11 so as to be seated upon left side 13, right side 14, front side 15 and rear side 16 in fluid tight relation through the medium of bolts 21.

A predetermined constant speed positively first driven (first output) shaft 25 is provided with a flanged end 26. A bearing 27, illustrated as a ball bearing, is held between housing 11 and cover 18 by means of a retaining member 28. A cap 200 provided with an axial orifice 201 is also provided with a circular flange 202 which abuts to retain the outer race of bearing 27 in position. Cap 200 is adapted to hold retaining member 28 in position with a washer 203 interposed between said cap 200 and retaining member 28. Bolts 30 pass through appropriate orifices in cap 200 and in retaining member 28 and engage threaded areas 204 in rear side 16 and in threaded areas in cover 18.

First driven shaft 25 is provided with a threaded area 205. A locking nut 206 and a lock washer 207 are located on shaft 25 whereby rotation of locking nut 206 engaging threaded area 205 secures inner race 208 of bearing 27 in position on shaft 25.

An oil retaining ring 31 is held in axial orifice 201 as by means of a drive fit. Oil retaining ring 31 engages shaft 25 in a fluid tight sealing relationship.

A worm wheel 33 is fastened to shaft 25 by means of keyway 34. A collar 209 located on shaft 25 is interposed between inner race 208 and the side of worm wheel 33 whereby worm wheel 33 is held in position on shaft 25 between flanged end 26 and collar 209 by means of locking nut 206.

A hollow sleeve 35 is provided with an enlarged head 36 adapted to mate with flanged end 26. A bearing 37, illustrated as a ball bearing, is held between front wall 15 and cover 18. A spacing collar 38 is provided on hollow sleeve 35. A ring gear 40 is provided with spur gear teeth 41 and a hub 42 which is rotatively mounted upon spacing collar 38.

A casing 45 is provided with an orifice 46 and an opening 47. Bolts 48 secure casing 45 to front side 15. A front wall 50 provided with a bearing 51, illustrated as a ball bearing, is secured to casing 45 by means of screws 52. A cover 53 is fastened to front wall 50 by means of screws 54. A stub or sun gear shaft 55 is rotatively mounted in bearing 51 on one end and in hollow sleeve 35 on the other end by means of collar 56. Opposite ends of stub or sun gear shaft 55 are threaded as at 57, 58. A worm wheel 60 is fastened to stub shaft 55 by means of a key 61. A lock nut 212 is rotatively mounted upon threads 57. A lock washer 214 is interposed between lock nut 212 and inner race 213. A washer 215 located upon stub shaft 55 is interposed between worm wheel 60 and inner race 213. A flange 216 on stub shaft 55 abuts worm wheel 60 and thereby provides a surface against which lock nut 212 may exert force through lock washer 214, inner race 213, washer 215 and worm wheel 60 to hold these members in position.

Hollow sleeve 35 is provided with a threaded area 216. A spacing collar 217 is placed upon hollow sleeve 35 between hub 42 and inner race 218. A lock washer 219 is placed upon hollow sleeve 35 between inner race 218 and a lock nut 220 is rotatively mounted upon threaded area 216 whereby lock nut 220 forces lock washer 219 against inner race 216 which abuts spacing collar 217 to force it against hub 42. Spacing collar 217 also retains spacing collar 38 in position on hollow sleeve 35.

A sun gear 62 is fastened to the end of stub or sun gear shaft 55 by means of a nut 63 rotatively engaging threads 58 which forces the sun gear 62 against a shoulder 64 formed in said stub shaft 55. A lock washer 59 may be interposed between nut 63 and sun gear 62.

Three spacing collars 65, 66, 67 are interposed between flanged end 26 and enlarged head 36 and are held in position by means of bolts 68, 69 and 70, to provide space for three planetary gears 71, 72, 73, rotatively mounted upon pintles, 74, 75, 76, respectively. Said pintles are held on opposite ends in flanged end 25 and in enlarged head 36. Planetary gears 71, 72, 73 engage sun gear 62 and ring gear 40.

In one form of drive shown in FIGURES 4, 5, 6 and 7, an idler spur gear 315 is provided as the drive medium between ring gear 40 and gear 307. In the form shown in FIGURE 9 idler spur gear 315 is eliminated and teeth 41 of ring gear 40 directly engage teeth 308 of gear 307. Idler spur gear 315 functions to cause gear 307 to rotate shaft 300 in the same direction of rotation as the direction of rotation of first driven shaft 25. When idler spur gear 315 is eliminated shaft 300 rotates in a direction opposite to the direction of rotation of first driven shaft 25.

With reference to FIGURE 11; a stud 317 is provided with a flanged end 318, a bearing 319 and a reduced area 320 provided with a thread 321. Front side 15 is provided with an orifice 322 adapted to receive bearing 319. Flanged end 318 abuts front side 15. Screws 323 secure flanged end 318 to front side 15. A bearing 324, illustrated as a ball bearing is mounted upon reduced area 320. The inner race 325 is held against shoulder 326 by means of lock nut 327 rotatively engaging thread 321. A lock washer 328 may be interposed between lock nut 237 and inner race 325. The gear 315 provided with teeth 315A is mounted for rotation upon bearing 324. Snap rings 331 and 332 prevent sidewise motion of gear 315 on bearing 324. Gear 315 is fixed to bearing 324 by means of a drive fit.

A boss 81 (see FIGURE 7) provided with an axial orifice 82, a circular seat 83, and a shoulder 79, is integrally formed in bottom 12 and projects upwardly therefrom. A bearing 84 abuts shoulder 79 and is held in circular seat 83 by means of a drive fit.

A bearing retaining member 86 having a flange 85, an inner wall 230 forming a chamber and an axial orifice 231 is located in an orifice 232 provided in right side 14. A bearing 90 is retained by inner wall 230 and end wall 233 formed in bearing retaining member 86. A cap 87 provided with an axial orifice 234, a flange 235 and a projection 236 is fastened to flange 85 and right side 14 by means of screws 88 with projection 236 slidably engaging inner wall 230. The end of projection 236 abuts bearing 90 to fix said bearing in position to receive a rotating shaft 80.

Power or input shaft 80 is provided with a worm gear 91, a threaded area 237, a reduced area 238, a circular shoulder 239 and a threaded end 240. Reduced area 238 is rotatively mounted in bearing 84 with circular shoulder 239, abutting bearing 84. A lock nut 241 rotatively engages threaded end 240. A washer 242 is interposed between lock nut 241 and bearing 84. A double lock nut 243 rotatively engages threaded area 237. Lock nuts 241 and 243 rotatively secure shaft 80 in bearings 84, 90. Power shaft 80 projects through axial orifice 24. A pulley 246 is fastened to power shaft 80 by means of key 247. Worm gear 91 rotatively engages to drive worm wheel 33, thereby to drive shaft 25.

A motor (not shown) of a preselected horsepower and preselected revolutions per minute is adapted to drive power shaft 80. The power for the positively driven variable speed mechanism shown in FIGURES 1 through 14 is derived from power shaft 80.

Casing 45 (see FIGURES 1, 2, 3, 5 and 9), is provided with a transverse hollow housing 250 integrally formed as the top thereof. Screws 251 secure left hand end 93 to hollow housing 250. Screws 252 secure right hand end 94 to hollow housing 250. Two bearings 98, 99 are secured, as by means of a drive fit, in transverse hollow housing 250. A work shaft 100 provided with a worm gear 101 is rotatively mounted in bearings 98, 99 with worm gear 101 rotatively engaging worm wheel 60. A pulley 253 is secured to shaft 100 by means of a key 254.

Front side 15 (see FIGURE 4) is provided with an axial passageway 260. Rear side 16 is provided with a bore 261. A bearing 262 is secured in axial passageway 260, as by means of a drive fit. A cover 263 is secured to front side 15 by means of screws 264. Cover 263 closes axial passageway 260. A retaining member 265 provided with a wall 266 having an axial orifice 267 and a flange 268 is positioned in bore 261. A bearing 270 is fixed in retaining member 265 abutting wall 266. A cap 271 having an axial passageway 272 and a projection 273 is secured to both flange 268 and rear side 16 by means of screws 275. A gasket 276 may be interposed between flange 268 and rear side 16. Projection 273 abuts bearing 270 to secure bearing 270 in operative position. An oil retaining ring 277 is held in axial passageway 272 by means of a drive fit.

A shaft 300, termed "The Second Output Shaft" is provided with an enlarged end 301 which abuts bearing 262, a bearing surface 302 which rotatively engages bearing 262, a shaft area 303 which rotatively engages bearing 270 and a reduced portion 304 having a thread 305. A gear 307 provided with teeth 308 is fixed to shaft 300 by means of a key 309. A spacing collar 310 is interposed between gear 307 and bearing 262. A sleeve 311 on shaft 300 is interposed between gear 307 and bearing 270 to act as a spacing member. A lock nut 312 rotatively engages thread 205. A lock washer 313 is interposed between lock nut 312 and bearing 270. Lock nut 312 holds shaft 300 in position in relation to bearings 262 and 270. Teeth 308 of gear 307 engage to be driven by spur gear 315. A speed control device or variator, generally indicated by reference numeral 350, is disclosed in United States Patent #2,469,653, dated May 10, 1949 and is used to illustrate one form of mechanism needed to vary the speed between the first driven output shaft 25 and the second driven output shaft 300.

FIGURES 1, 2, 3, 12, 13 and 14 illustrate the variator which is a stepless change-speed gearing mechanism comprising a first shaft 401 and a second shaft 408 in coaxial disposition, and roller bodies coacting with two coaxial frictional faces formed as surfaces of revolution, and in which a rotatable frame member carries all of the roller bodies. In this structure a tilting of the axes of the roller bodies causes a stepless change in the gear ratio between the first shaft 401 and the second shaft 408. A spring, the tension of which is adjustable, is provided for producing the contact pressure between the drive-transmitting surfaces, which spring acts axially against one surface of revolution and is so disposed that the axial thrusts exerted by the two surfaces of revolution are taken up by one of the said shafts, that is, no axial thrusts are transmitted to the gear case or box.

A pulley body 402, provided with the one surface of revolution, is keyed to the shaft 401. The latter is journalled in a ball bearing 425 in the casing 422 which is provided with a cover 421 in which a counter pulley body 406 provided with the other surface of revolution, is rotatably mounted and secured to the flange 407 of second shaft 408. The extension of first shaft 401 is journalled in the said flange 407 in the ball bearing 413 and inside the surface of revolution 406 in a ball bearing 426 also. The shafts 401 and 408 and the bodies of revolution 402 and 406 are co-axial.

Five roller bodies, formed as balls 403, are in frictional contact with the surfaces of revolution embodied on the bodies 402 and 406, and with a rotatable encircling ring 405. Each ball 403 is mounted on an axle 450 passing therethrough, which latter in the vicinity of one of its ends, is guided in a curved slot 452 of a disc-like frame 453, by means of a spherically shaped collar 451; while the two ends of the said axles 450 are guided in radial grooves 452 of the casing 422. The said frame 453 is mounted rotatively adjustable in the casing 422, that is, there is a sliding fit between the casing 422 and the cover 421 thereof.

The said disc 453 may be rocked by means of a lever 415 between the terminal positions shown by the dash-and-dot lines on top of FIGURE 14. By swinging the lever 416 in one direction or the other, the axles 450 of the balls 403 are tilted. In FIGURE 12 the control element or lever 416 is in its means position, wherein the axles 450 of the balls 403, are parallel to the common axis of the shafts 401 and 408, and the points of contact of the balls 403 with the surfaces of revolution of the bodies 402, and 406, which latter are of equal diameter, are equally spaced from the axles 450 of the balls, whereby the gear ratio is unity or 1:1. When the control element or lever 416 is moved into the left-hand terminal position of FIGURE 14, the axles 450 of the balls are tilted into the position shown in FIGURE 13 wherein the points of contact of the balls with the surfaces of revolution of the bodies 406 and 402 are spaced unequally from the axis of rotation of the balls. Referring to FIGURE 13, if 401 is the driving or first shaft, the second or driven shaft 408, will run at less speed; and conversely, when the control element or lever 416 is thrown into the right-hand terminal position.

In order to produce the necessary contact pressure between the surfaces of revolution and the balls 403, a helical spring 411 is provided, which at one end abuts against a nut 412 mounted on the extension of first shaft 401, and at its other end against a ball bearing 410 on the body 406. By displacing the nut 412 on the threaded stub extension of the first shaft 401, the tension of the spring 411 is adjusted. The axial components of this contact pressure of the bodies 402 and 406 against the balls 403 are not transferred onto the casing 421, 422, but are taken up by first shaft 401, and the radial components by the ring 405. The latter is floating, that is, freely rotatable, and may adjust itself in an axial direction. This disposition ensures a positive and reliable transmission of the power.

A mounting pad 343 is fixed to cover 18. The variator 350 is fixed to mounting pad 343 by means of screws 344.

A pulley 341 is fastened to variator first shaft 401. A pulley 342 is fastened to second shaft 408. A belt 650 connects pulleys 246 and 341. A belt 351 connects pulleys 253 and 342.

In the modified form of speed control device illustrated in FIGURE 15, an electrical D.C. or direct current motor 600 provided with a revolving shaft 601 having a pulley 602 secured thereto is fixed to cover 18 by means of bolts 603. A belt 604 connects motor 600 with pulley 253 and work shaft 100. A rheostat 605 controls the speed of motor 600 so that revolving shaft 601 may be varied in its r.p.m. or revolutions per minute.

In comparing FIGURE 1 with FIGURE 15 it will be noted that D.C. motor 600 serves the dual purpose of both a driving medium and a variator or speed change device.

In operation, a source of power, preferably an electric motor (not shown) will be attached to input drive power shaft 80 whereby worm gear 91 rotates worm wheel 33 and first output or planetary gear drive shaft 25.

First output shaft 25 may be the predetermined speed and uniformly rotating shaft of a longitudinal stretcher used in stretching web material. The worm gear 80, worm wheel 33 combination provides a gear train whereby the revolutions per minute of input power shaft 80 are changed to a preselected r.p.m. for first output shaft 25. It will be noted that the gear train, worm gear 80, worm wheel 33, provide a positive non-slipping drive connection between input power shaft 80 and first output shaft 25 and the speed of first output shaft 25 is uniform and constant.

Simultaneously, while driving first output shaft 25, power input shaft 80 drives first or input shaft 401 of the variator or speed control device 350, through pulleys 246, 341 and belt 650.

As previously described the mechanism of speed control device or variator 350 will vary or change the speed relation between first shaft 401 and second shaft 408 in accordance with the position of control element 416.

Second shaft 408 rotates work shaft 100 through pulleys 342, 253 and belt 351. Work shaft 100 rotates stub or sun gear shaft 55 through worm gear 101 and worm wheel 60.

First output driven shaft 25 which rotates at a uniform and constant speed rotates pintles 74, 75, 76 (see FIGURE 6) in the direction of the arrow "A" or in a clockwise direction.

Assuming that sun gear shaft 55 is stopped and planetary gears 71, 72, 73 are also stopped. The movement of pintles 74, 75, 76 through the rotation of first output shaft 25 causes the planetary gears 71, 72, 73 to drive ring gear 40 in the same or clockwise direction. Assuming that sun gear shaft 55 begins to rotate at ten revolutions per minute. Then sun gear 62 will rotate planetary gears 71, 72, 73 in a direction counter to the direction of rotation of pintles 71, 72, 73 or in a counter clockwise direction. In that event ring gear 40 rotates at a speed of the revolutions per minute of first output driven shaft 25 minus the speed or revolutions per minute of sun gear 62. As the speed of sun gear shaft 55 and sun gear 62 increases, the speed of rotation of ring gear 40 decreases until the relative speed of sun gear 62 reaches a preselected speed in relation to the speed of rotation of first output driven shaft 25. In which event ring gear 40 ceases to rotate.

Figure 4:
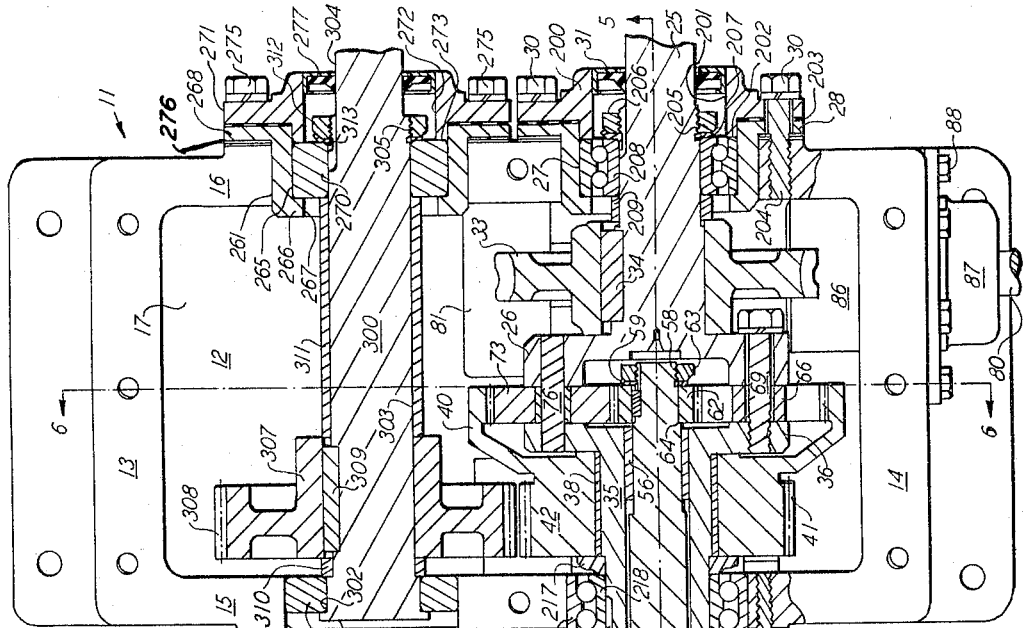
FIGURE 4 is a horizontal cross sectional view taken on line 4—4 of FIGURE 6.
Figure 3:
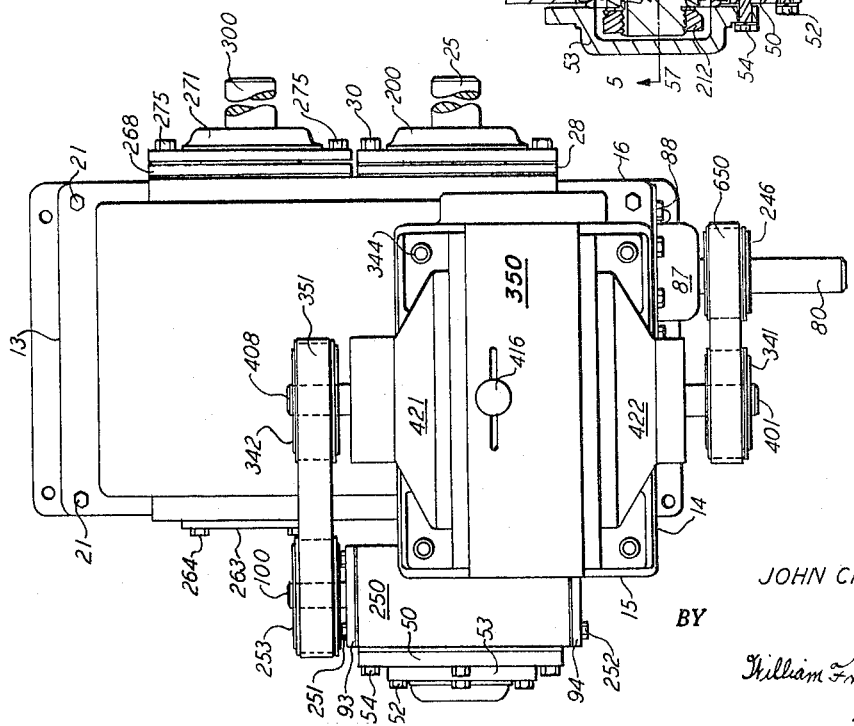
FIGURE 3 is a plan view of FIGURE 1.
Figure 5:
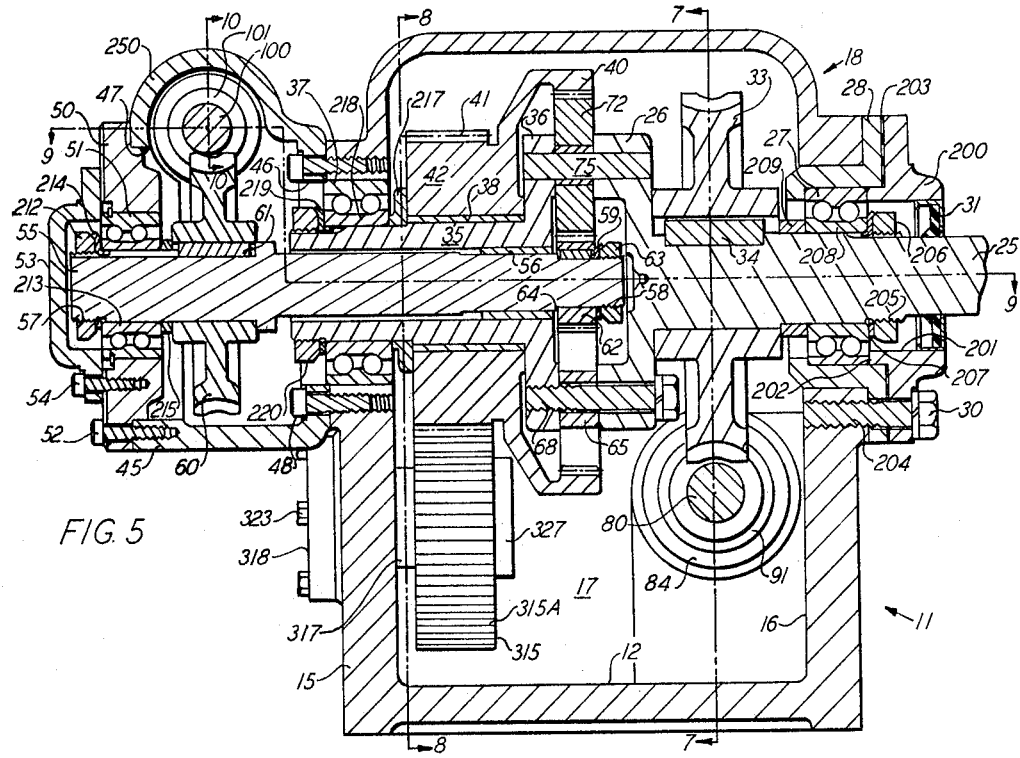
FIGURE 5 is a transverse cross sectional view taken on line 5—5 of FIGURE 4.

Rotation of ring gear 40 and integrally formed spur gear teeth 41 rotate gear 307 and second output driven shaft 300 either through direct engagement of spur gear teeth 41 with teeth 308 (see FIGURE 9), in which event driven shaft 300 rotates in a counter direction to the direction of rotation of first output driven shaft 25, or as illustrated in FIGURES 4 and 8, spur gear teeth 41 engage idler spur gear 315 which rotatively engages teeth 308 to rotate second output driven shaft 300 in the same direction of rotation as first output driven shaft 25.

It is obvious that it is immaterial to the operation of the present positively driven variable speed mechanism whether the speed control device employed is a variator 350 or a direct current motor 600 provided with a rheostat control or any other speed control device.

What is important to the present invention is that stub or sun gear shaft 55 be driven through a range of speeds which controls the speed of sun gear 62 to allow the planetary gear train to rotate second output driven shaft 300 at the same speed as first output driven shaft 25 or allow second output driven shaft 300 to be stopped even though first output driven shaft 25 and sun gear shaft 55 are rotating.

Having shown and described preferred embodiments of the present invention by way of example, it should be realized that structural changes could be made and other examples given without departing from either the spirit or scope of this invention.

What I claim is:

1. A positively driven variable speed mechanism consisting of a power shaft, a first output driven shaft, a second output driven shaft, said first and second output driven shafts being parallel, a worm gear and worm wheel driving connection between said power shaft and said first output driven shaft, a sun gear shaft provided with a sun gear on one end, a planetary gear train drivably connecting said sun gear and sun gear shaft and said first output driven shaft, a gear train drivably connecting said planetary gear train and said second output driven shaft, and a speed control device provided with a control element drivably connecting said power shaft and said sun gear shaft and sun gear whereby the speed of the second output driven shaft may be varied through said sun gear, said planetary gear train and said gear train in relation to the speed of the first output driven shaft at the will of the operator through the control element.

2. A positively driven variable speed mechanism consisting of a power shaft, a first driven shaft, a second driven shaft, a worm gear and worm wheel driving connection between said power shaft and said first driven shaft, a work shaft, a sun gear shaft provided with a sun gear, a worm gear and worm wheel driving connection between said work shaft and said sun gear shaft, a planetary gear train drivably connecting said sun gear shaft thru said sun gear and said first driven shaft, a gear train drivably connecting said planetary gear train and said second driven shaft, and a speed control device provided with a control element drivably connecting said power shaft and said work shaft whereby the speed of the second driven shaft may be varied in relation to the speed of the first driven shaft from a zero speed to the speed of the first driven shaft at the will of the operator through the control element.

3. A positively driven variable speed mechanism consisting of a rotatable power shaft, a first driven shaft, a worm gear and worm wheel drivably connecting said power shaft and said first driven shaft, a second driven shaft, a work shaft, a sun gear shaft, a worm gear and worm wheel drivably connecting said work shaft and said sun gear shaft, a sun gear fixed to said sun gear shaft, a plurality of planetary gears rotatively mounted on said first driven shaft, a ring gear, a gear train drivably connecting said ring gear and said second driven shaft, said plurality of planetary gears rotatively engaging said sun gear and said ring gear, a speed control device, means drivably connecting said speed control device and said work shaft whereby said speed control device rotates said sun gear to vary the speed of said second driven shaft in relation to the speed of rotation of said first driven shaft driving said second driven shaft through said plurality of planetary gears, said ring gear and said gear train.

References Cited by the Examiner

UNITED STATES PATENTS

| | | | |
|---|---|---|---|
| 1,711,038 | 4/1929 | Bronander | 74—691 |
| 2,312,105 | 2/1943 | Liebrecht | 74—691 |
| 2,716,357 | 8/1955 | Rennerfelt | 74—691 |
| 2,745,297 | 5/1956 | Andrus | 74—689 |
| 2,755,683 | 7/1956 | Ryan | 74—690 X |
| 2,889,716 | 6/1959 | Doty | 74—689 |
| 3,132,533 | 5/1964 | Baker | 74—687 |

FOREIGN PATENTS 866,748   12/1952   Germany.

OTHER REFERENCES

Radzimovsky: "Planetary Gear Drives," Machine Design, pp. 144–153, June 11, 1959.

DAVID J. WILLIAMOWSKY, *Primary Examiner.*

DON A. WAITE, *Examiner.*

M. H. FREEMAN, T. C. PERRY, *Assistant Examiners.*